U. G. WHITE.
CURRY-COMB.
No. 186,652. Patented Jan. 23, 1877.
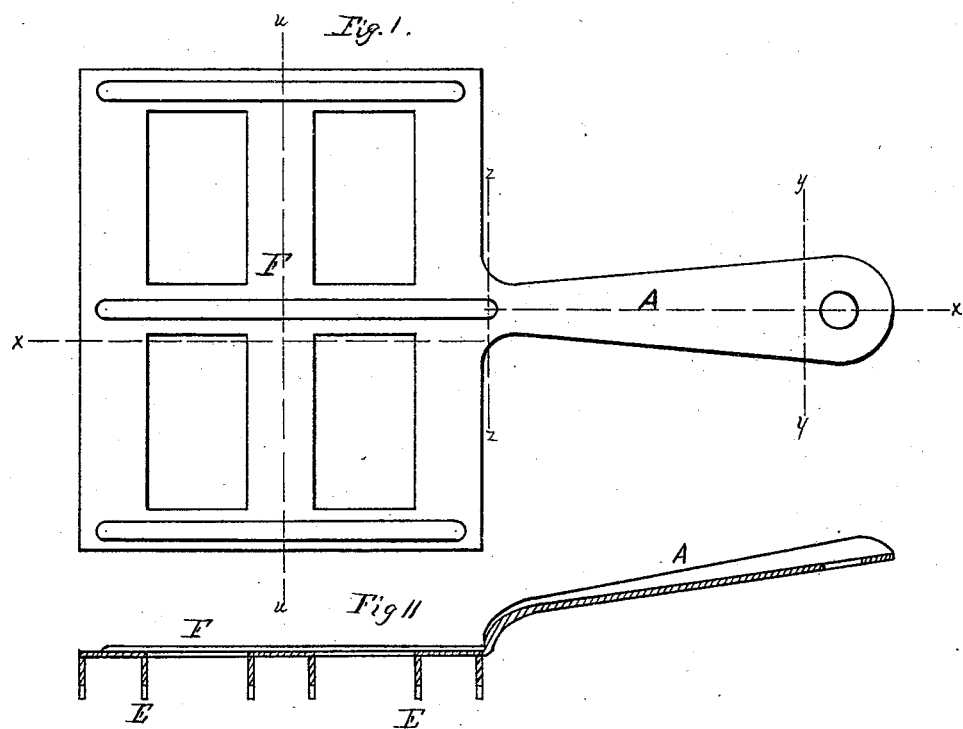
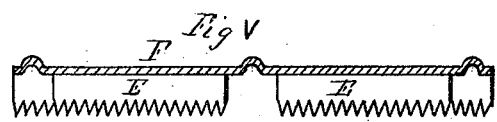
 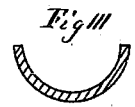
WITNESSES
INVENTOR
Ulysses G. White

UNITED STATES PATENT OFFICE.

ULYSSES G. WHITE, OF WASHINGTON, DISTRICT OF COLUMBIA.

IMPROVEMENT IN CURRY-COMBS.

Specification forming part of Letters Patent No. 186,652, dated January 23, 1877; application filed January 19, 1877.

*To all whom it may concern:*

Be it known that I, ULYSSES G. WHITE, of the city of Washington, District of Columbia, have invented a new and useful Improvement in Curry-Combs, of which the following is a specification, reference being had to the accompanying drawings.

The object of my invention is to furnish to the trade a curry-comb in which are combined cheapness, durability, flexibility, lightness, and other qualities of advantage and merit in such articles.

The invention is illustrated in the drawings, in which Fig. 1 is a plan view, the remaining figures being detail drawings.

This invention consists of a curry-comb, which, together with its handle, is made from one solid piece of sheet metal, the handle and the back being partly corrugated, so as to increase its strength and stiffness.

In the drawings, F designates a curry-comb, which, together with its handle A, is formed from a single piece of sheet metal, either by stamping it up by means of dies, or by any other means, the pattern being such that in cutting out the blanks very little if any metal is wasted.

In the drawings, the back of the comb is shown partly corrugated, as is also the handle. It is evident these corrugations may be omitted, or the edges of the handle may be turned down instead of up, as shown in the drawings, without departing from the spirit of the invention.

I am aware that solid cast-metal combs are old, and I do not claim, broadly, a metallic comb made in one piece; but What I do claim, and desire to secure by Letters Patent, is—

As an article of manufacture, a sheet-metal curry-comb, the body, tooth-bars, and handle of which are made of one piece of sheet metal, substantially as shown and described.

In testimony that I claim the above as my invention I hereunto subscribe my name in presence of two witnesses.

ULYSSES G. WHITE.

Witnesses:
 WARREN I. COLLIMER,
 B. N. WEST.